July 21, 1942.   I. S. KEELER ET AL   2,290,807
HANDLE
Filed Sept. 9, 1940
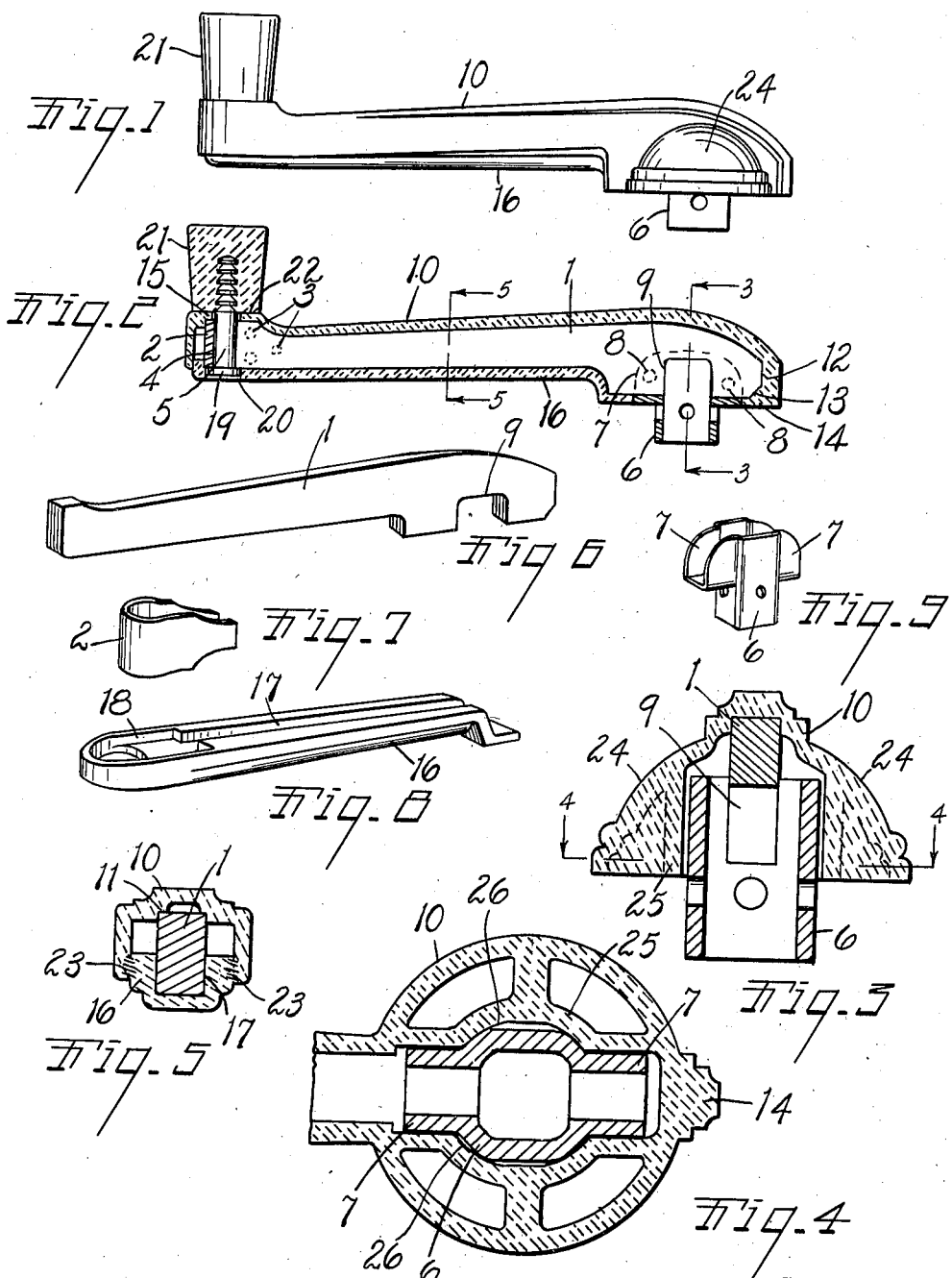
INVENTOR.
Isaac S. Keeler
Gerald V. Jakeway
BY Earl D. Chappell
ATTORNEYS Patented July 21, 1942

2,290,807

UNITED STATES PATENT OFFICE 2,290,807

HANDLE

Isaac S. Keeler and Gerald V. Jakeway, Grand Rapids, Mich., assignors to Keeler Brass Company, Grand Rapids, Mich.

Application September 9, 1940, Serial No. 356,020

12 Claims. (Cl. 74—545)

The main objects of this invention are to provide an improved handle well adapted as a remote control handle for automobile doors, windows and the like which is highly attractive in appearance, strong and durable, and at the same time the external parts of which may be formed of plastic materials in a wide variety of designs and colors without substantial variation in structure.

Second, to provide a handle of the above character in which the plastic casing is effectively supported throughout and secured to the metal handle bar so that the strain on the plastic portion is very slight.

Objects pertaining to details and economies of the invention will definitely appear from the description to follow. The invention is defined in the claims.

A structure which embodies the features of our invention is clearly illustrated in the accompanying drawing in which:

Fig. 1 is a side elevation of a remote control handle embodying the features of our invention.

Fig. 2 is a central longitudinal section, the grip stem being shown in full lines.

Fig. 3 is an enlarged transverse section on line 3—3 of Fig. 2.

Fig. 4 is a fragmentary section on line 4—4 of Fig. 3.

Fig. 5 is a transverse section on line 5—5 of Fig. 2.

Fig. 6 is a perspective view of the handle bar.

Fig. 7 is a perspective view of the grip stem bearing member.

Fig. 8 is an inside perspective view of the inner casing or backing member.

Fig. 9 is a perspective view of the spindle socket member.

The embodiment of our invention illustrated is especially designed as a remote control handle for automobile windows and the like. The structure comprises a handle bar 1 formed of suitable metal and preferably of flat cross section. To the outer end of this handle bar 1, we secure a U-shaped curved strip 2 preferably spot-welding as indicated at 3 so as to provide a bearing 4 for the grip stem or spindle 5. To the inner end of the handle bar we secure the spindle socket member 6, this socket member having a slot-like recess receiving the handle bar and being provided with flanges 7 which are spot-welded to the sides of the handle bar as indicated at 8. The handle bar is provided with a recess 9 alined with the socket, the walls of the recess constituting a part of the socket walls.

This handle bar is encased in and constitutes a support for the shell-like casing members which in the embodiment illustrated comprise the outer casing member 10 formed of plastic material such for example as "Tenite." This material is mentioned as we have found it suitable for the purpose and it may be readily molded to the desired shape. The casing member 10 is of channel cross section as illustrated and is provided with an internal longitudinal central groove or channel 11 receiving the outer edge of the handle bar 1 and closely fitting the same. This outer casing is extended around the inner end 12 of the handle bar which is undercut at 13, the casing member having a portion 14 underlying this undercut portion and coacting therewith to retain the casing member upon the handle bar. The outer casing member is conformed at 15 to fit the upper edge of the grip stem bearing member 2.

The inner or backing casing member 16 has a longitudinal groove 17 therein which receives the lower edge of the handle bar, this groove being widened into a recess 18 at the outer end of the member 16 to receive the lower edge of the member 2 which is in supporting engagement with the member 16. The grip stem is provided with a head 19 at its lower end, the member 16 having a hole 20 receiving this head so that any strain on the stem is carried by the handle bar. The finger piece or grip 21 is secured upon the end of the stem, the outer casing member having a flattened portion 22 constituting a seat for this grip member 21.

In this preferred embodiment the casing member 16 is telescoped into the outer casing member and the casing members are secured together at their joint by an autogenous fuse as indicated at 23. This may be effected with certain plastic materials by the application of heat and with others by the application of solvents, or the parts might be otherwise adhered or secured together.

It will be noted that the design of the members is complementary and this can be greatly varied without changing the structure. In this embodiment illustrated the outer casing member 10 is provided with enlargements 24 at its inner end which give the proper balance and ornamental effect. We also reinforce the outer casing member at this point by internal reinforcing spiders 25 as shown in Fig. 4, these spiders having opposed seats 26 formed therein receiving and in supporting engagement with the socket member 6.

With this arrangement of parts the shell or casing formed of plastic material may have quite thin walls and at the same time the casing is effectively supported throughout and is so mounted that there are no substantial stresses thereon in the operation of the handle. While we have mentioned "Tenite" as a material we have found to be satisfactory for the purpose on account of the ease with which it may be molded and the fact the the joints may be easily and effectively formed, we recognize that there are numerous plastic materials that could be used with considerable success.

We have illustrated and described our improvements in an embodiment which we have found very satisfactory. We have not attempted to illustrate and describe various embodiments which we contemplate as it is believed the disclosure made will enable the adaptation of our invention as may be desired.

Having thus described our invention what we claim as new and desire to secure by Letters Patent is:

1. In a handle, the combination of a handle bar of flat section and having a U-shaped curved strap secured to its outer end providing a grip stem bearing, a spindle socket member having flange portions embracing said handle bar and secured thereto, said handle bar having a spindle receiving recess alined with said spindle socket, an outer casing member of channel cross section embracing and in supporting engagement with said handle bar, said outer casing member having an internal longitudinal groove fittingly receiving the outer edge of said handle bar, said casing being extended around and in retaining engagement with the inner end of said handle bar and having at its base end a lateral enlargement provided with an internal spider portion engaging said spindle socket member, an inner casing member having an internal longitudinal groove receiving the inner edge of said handle bar and having an internal recess at its outer end receiving said grip stem bearing, said inner casing member being telescoped within the flanges of said outer casing member and secured thereto, a grip, and a headed stem therefor disposed through said stem bearing, said inner casing member having an opening receiving the head of said stem, said outer casing member having a flattened portion constituting a seat for said grip and said bearing member constituting a support for said casing members at the outer ends thereof.

2. In a handle, the combination of a handle bar of flat section and having a U-shaped curved strap secured to its outer end providing a grip stem bearing, an outer casing member of channel cross section embracing and in supporting engagement with said handle bar, said outer casing member having an internal longitudinal groove fittingly receiving the outer edge of said handle bar, an inner casing member having an internal longitudinal groove receiving the inner edge of said handle bar and having an internal recess at its outer end receiving said grip stem bearing, said inner casing member being telescoped within the flanges of said outer casing member and secured thereto, a grip, and a headed stem therefor disposed through said stem bearing, said inner casing member having an opening receiving the head of said stem, said outer casing member having a flattened portion constituting a seat for said grip and said bearing member constituting a support for said casing members at the outer ends thereof.

3. In a handle, the combination of a handle bar of flat section and having a U-shaped curved strap secured to its outer end providing a grip stem bearing, a spindle socket member having flange portions embracing said handle bar and secured thereto, said handle bar having a spindle receiving recess alined with said spindle socket, an outer casing member of channel cross section embracing and in supporting engagement with said handle bar, said casing being extended around and in retaining engagement with the inner end of said handle bar and having at its base end a lateral enlargement provided with an internal spider portion engaging said spindle socket member, an inner casing member receiving the inner edge of said handle bar and telescoped within said outer casing member and secured thereto, a grip and a headed stem therefor disposed through said stem bearing, said inner casing member having an opening receiving the head of said stem, said outer casing member having a flattened portion constituting a seat for said grip and said bearing member constituting a support for said casing members at the outer ends thereof.

4. In a handle, the combination of a handle bar of flat section and having a U-shaped curved strap secured to its outer end providing a grip stem bearing, an outer casing member of channel cross section embracing and in supporting engagement with said handle bar, an inner casing member receiving the inner edge of said handle bar and telescoped within said outer casing member and secured thereto, a grip, and a headed stem therefor disposed through said stem bearing, said inner casing member having an opening receiving the head of said stem, said outer casing member having a flattened portion constituting a seat for said grip and said bearing member constituting a support for said casing members at the outer ends thereof.

5. In a handle, the combination of a handle bar provided with a spindle socket member, an outer casing member of channel cross section embracing and in supporting engagement with said handle bar, said outer casing member having an internal longitudinal groove fittingly receiving the outer edge of said handle bar, said casing member being extended around and in retaining engagement with the inner end of said handle bar and having an internal spider portion engaging said spindle socket member, an inner casing member having an internal longitudinal groove receiving the inner edge of said handle bar, said inner casing member being telescoped with said outer casing member and secured thereto, a grip, and a stem therefor carried by said handle bar and projecting from said casing.

6. In a handle, the combination of a handle bar provided with a spindle socket member, an outer casing member of channel cross section embracing and in supporting engagement with said handle bar, said casing member having an internal spider portion engaging said spindle socket member, an inner casing member receiving the inner edge of said handle bar, said inner casing member being adherently secured to said outer casing member, a grip, and a stem therefor carried by said handle bar and projecting from said casing out of supporting engagement therewith whereby strain on the stem is carried by the handle bar.

7. In a handle, the combination of a handle bar provided with a spindle socket member, an outer hollow, shell-like casing member of channel cross section embracing and in supporting engagement with said handle bar, said casing member having an internal spider portion engaging said spindle socket member, and an inner casing member adherently secured to said outer casing member.

8. In a handle, the combination of a handle bar provided with spindle attaching means, a premolded casing member of channeled section formed of plastic material embracing said handle bar and having a longitudinal groove fittingly receiving the outer edge of said handle bar, an inner premolded casing member having a longitudinal groove fittingly receiving the inner edge of said handle bar, said inner casing member being telescoped with said outer casing member and adherently secured thereto at the joint, a grip stem carried by said handle bar and supported thereby to the exclusion of strain on said casing members, and a grip mounted on said stem.

9. In a handle, the combination of a handle bar provided with spindle attaching means, said handle bar sustainingly carrying a grip stem, a casing comprising premolded inner and outer members formed of plastic material embracing and in supporting engagement with said handle bar with said stem projecting therefrom and out of strain imparting engagement therewith, and a grip on said stem.

10. In a handle, the combination of a handle bar provided with spindle attaching means, a casing comprising premolded complementary members formed of plastic material embracing and in supporting engagement with said handle bar, said casing members having fused connecting portions, a grip stem carried by said handle bar and supported thereby to the exclusion of strain on said casing, said stem projecting from said casing, and a grip on the outer end of said stem.

11. In a handle, the combination of a handle bar provided with a spindle socket member, an outer casing member of channel cross section embracing and in supporting engagement with said handle bar, said casing member having an internal spider portion engaging said spindle socket member, an inner casing member receiving the inner edge of said handle bar, said inner casing member being secured to said outer casing member, a grip, and a stem therefor carried by the handle bar and projecting from said casing out of supporting engagement therewith whereby strain on the stem is carried by the handle bar.

12. In a handle, the combination of a handle bar provided with a spindle socket member, an outer hollow, shell-like casing member of channel cross section embracing and in supporting engagement with said handle bar, said casing member having an internal spider portion engaging said spindle socket member, and an inner casing member secured to said outer casing member.

ISAAC S. KEELER.
GERALD V. JAKEWAY.